US012584562B2

(12) United States Patent
Collins et al.

(10) Patent No.: US 12,584,562 B2
(45) Date of Patent: Mar. 24, 2026

(54) FLOW RESTRICTOR

(71) Applicant: OFIP LIMITED, Oxford (GB)

(72) Inventors: Matthew Collins, Oxford (GB);
Antony Houghton, Oxford (GB)

(73) Assignee: OFIP LIMITED, Oxford (GB)

( * ) Notice: Subject to any disclaimer, the term of this
patent is extended or adjusted under 35
U.S.C. 154(b) by 0 days.

(21) Appl. No.: 18/042,904

(22) PCT Filed: Aug. 24, 2021

(86) PCT No.: PCT/GB2021/052201
§ 371 (c)(1),
(2) Date: Feb. 24, 2023

(87) PCT Pub. No.: WO2022/043680
PCT Pub. Date: Mar. 3, 2022

(65) Prior Publication Data
US 2023/0323971 A1 Oct. 12, 2023

(30) Foreign Application Priority Data
Aug. 27, 2020 (GB) ...................................... 2013463

(51) Int. Cl.
*F16K 5/04* (2006.01)
*F16K 5/12* (2006.01)
(Continued)

(52) U.S. Cl.
CPC .......... *F16K 17/048* (2013.01); *F16K 5/0407*
(2013.01); *F16K 5/12* (2013.01); *F16K 17/105*
(2013.01); *F16K 47/01* (2021.08)

(58) Field of Classification Search
CPC .. G05D 16/106; G05D 16/024; G05D 16/166;
G05D 7/03; Y10T 137/3421;
(Continued)

(56) References Cited

U.S. PATENT DOCUMENTS 263,371 A * 8/1882 Shaw ........................ E06B 9/54
160/245
263,731 A * 9/1882 Shaw .................... B05B 1/3006
251/63.5
(Continued)

FOREIGN PATENT DOCUMENTS

DE 2748734 A1 5/1979
EP 1201805 B1 8/2006
WO 2019058110 A1 3/2019

OTHER PUBLICATIONS

Search Report under Section 17 for United Kingdom Patent Appli-
cation No. GB2013463.1 dated Dec. 15, 2020, 2021, 4 pages.
(Continued)

*Primary Examiner* — Craig J Price
(74) *Attorney, Agent, or Firm* — Withrow + Terranova,
PLLC; Vincent K. Gustafson

(57) ABSTRACT

A fluid-flow control device includes a valve aperture and a
mounting member arranged downstream of the aperture. A
valve member, movably mounted on the mounting member,
controls the flow of fluid through the aperture. A control
volume, defined between the mounting member and the
valve member receives a control fluid from a control fluid
feed. A variable flow restrictor is rotatably arranged within
a restriction volume of the control fluid feed such that a flow
path connecting the inlet, and the outlet, of the restriction
volume is defined between the restrictor and the wall of the
restriction volume. The restrictor is axi-symmetric about its
axis of rotation.

3 Claims, 6 Drawing Sheets

(51) Int. Cl.
    *F16K 17/04*       (2006.01)
    *F16K 17/10*       (2006.01)
    *F16K 47/00*       (2006.01)

(58) Field of Classification Search
    CPC ......... Y10T 137/7759; Y10T 137/3118; Y10T
            137/0318; B60C 25/145; F16K 17/105;
            F16K 17/048; F16K 47/01; F16K 5/0407;
            F16K 5/12; F16K 1/126; F41B 11/721;
                  F41B 11/722; F41B 11/723
    USPC ...... 251/208, 209, 903, 25, 33–46, 63, 63.5,
            251/118–127, 314, 48; 137/219–222,
            137/614.2; 415/27, 28, 144, 145; 222/3,
               222/195; 124/73, 75, 70; 92/162 R;
                    141/38; 157/1.1, 1.17
    See application file for complete search history.

(56) References Cited

U.S. PATENT DOCUMENTS

| | | | | |
|---|---|---|---|---|
| 1,520,117 A * | 12/1924 | Buehle | F16K 1/126 | 137/219 |
| 1,619,937 A * | 3/1927 | Huff | F16K 29/00 | 137/903 |
| 2,044,437 A * | 6/1936 | MacPherson | F16K 1/126 | 137/220 |
| 2,124,619 A * | 7/1938 | Kerr | F16K 1/126 | 137/220 |
| 2,191,532 A * | 2/1940 | Kinzie | F16K 1/12 | 137/221 |
| 2,841,359 A * | 7/1958 | Berck | F16K 47/023 | 137/219 |
| 2,919,714 A * | 1/1960 | Mrazek | G05D 16/2095 | 137/220 |
| 3,092,132 A * | 6/1963 | Guy | F16K 1/12 | 137/219 |
| 3,101,924 A * | 8/1963 | Berck | F16K 21/18 | 251/63 |
| 3,141,386 A * | 7/1964 | Loughridge | B66B 1/24 | 251/44 |
| 3,144,039 A * | 8/1964 | Bloomquist | F16K 21/10 | 251/38 |
| 3,219,052 A * | 11/1965 | Schaller | F16K 17/105 | 137/220 |
| 3,231,234 A * | 1/1966 | Williamson | B21D 24/02 | 251/291 |
| 3,252,480 A * | 5/1966 | Odendahl | F16K 47/04 | 251/126 |
| 3,338,259 A * | 8/1967 | Tribe | F16K 1/126 | 137/220 |
| 3,350,054 A * | 10/1967 | Wray | F04D 27/023 | 251/29 |
| 3,359,998 A * | 12/1967 | Fike | F16K 1/126 | 137/220 |
| 3,521,661 A * | 7/1970 | Staiger | F04D 27/023 | 137/220 |
| 3,788,355 A | 1/1974 | Wood | | |
| 4,026,327 A * | 5/1977 | Deinlein-Kalb | F01D 17/145 | 137/219 |
| 4,331,173 A * | 5/1982 | Culaud | F03B 15/20 | 137/219 |

| | | | | |
|---|---|---|---|---|
| 4,363,464 A * | 12/1982 | Spils | F16K 47/04 | 251/266 |
| 4,610,265 A * | 9/1986 | Nelson | F16K 1/126 | 251/30.01 |
| 4,789,000 A * | 12/1988 | Aslanian | A61M 5/16881 | 604/32 |
| 4,802,506 A * | 2/1989 | Aslanian | A61M 5/16881 | 251/312 |
| 4,807,660 A * | 2/1989 | Aslanian | A61M 5/16881 | 604/32 |
| 4,881,718 A * | 11/1989 | Champagne | F16K 5/0605 | 251/316 |
| 5,113,904 A * | 5/1992 | Aslanian | A61M 5/16881 | 251/312 |
| 5,174,545 A * | 12/1992 | Blais | F04D 27/0215 | 417/27 |
| 5,450,839 A * | 9/1995 | Nicolaevich | F41B 11/62 | 124/75 |
| 5,540,252 A * | 7/1996 | Bruun | G05D 7/0146 | 137/220 |
| 7,789,066 B2 * | 9/2010 | Torii | F02M 35/10255 | 123/336 |
| 8,113,228 B2 * | 2/2012 | Ropponen | F04C 29/126 | 137/220 |
| 8,733,387 B2 * | 5/2014 | Kolacz | F16K 1/126 | 251/25 |
| 9,121,510 B2 * | 9/2015 | Volovec | G05D 16/106 | |
| 9,759,335 B2 * | 9/2017 | Jones | F16K 5/12 | |
| 9,822,893 B2 * | 11/2017 | Kunau | F16K 24/04 | |
| 10,266,019 B2 * | 4/2019 | Kunau | B60C 25/138 | |
| 10,301,050 B2 | 5/2019 | Donati et al. | | |
| 10,823,308 B1 * | 11/2020 | DeFelice | G05D 7/0133 | |
| 10,838,439 B2 * | 11/2020 | Povey | F16K 1/126 | |
| 10,890,259 B2 * | 1/2021 | Villanueva | F16K 1/12 | |
| 11,079,037 B2 * | 8/2021 | Kunau | F16K 31/383 | |
| 11,680,575 B2 * | 6/2023 | Mezzino | F02C 6/08 | 60/785 |
| 11,686,400 B2 * | 6/2023 | George | F16K 3/26 | 137/561 R |
| 12,110,988 B2 * | 10/2024 | Kirollos | F16K 31/1221 | |
| 12,140,239 B2 * | 11/2024 | Hall | F16K 25/005 | |
| 12,259,063 B2 * | 3/2025 | Maine | F16K 5/0407 | |
| 2015/0008348 A1 * | 1/2015 | Greene | F16K 1/126 | 251/324 |
| 2015/0316192 A1 | 11/2015 | Jones et al. | | |
| 2017/0342853 A1 * | 11/2017 | Schwalm | F16K 17/02 | |
| 2019/0155317 A1 | 5/2019 | Povey et al. | | |
| 2020/0370669 A1 * | 11/2020 | Hall | F16K 15/026 | |
| 2022/0235879 A1 * | 7/2022 | Kirollos | F16K 15/063 | |

OTHER PUBLICATIONS

Notification of Transmittal (Form PCT/ISA/220), International Search Report (Form PCT/ISA/210), and Written Opinion (Form PCT/ISA/237) for International Application No. PCT/GB2021/052201 mailed Dec. 6, 2021, 14 pages.

Mooney* Type 24/24S Restrictor: Installation, Operation and Maintenance Manual (Rev. C), General Electric Company, Jan. 2017, 8 pages.

Examination Report for European Patent Application No. 21766200.6, mailed Jan. 16, 2025, 6 pages.

* cited by examiner

238

204

238        204

FLOW RESTRICTOR

This application is a 35 U.S.C. § 371 national phase filing of International Application No. PCT/GB2021/052201, filed on Aug. 24, 2021, and claims the benefit of United Kingdom Patent Application No. 2013463.1 filed on Aug. 27, 2020, wherein the entire contents of the foregoing applications are hereby incorporated by reference herein.

The present invention relates to a device for controlling the flow of fluid therethrough, in particular to a device including a damping system that is arranged to adjust the sensitivity of such a device.

In fluid flow systems such as pipes and conduits, which can be found in many different fluid regulation and distribution networks across various industries, there is a need to regulate the pressure or flow rate in a fluid flow stream. Fluid flow regulating devices often comprise a valve member that opens and closes a valve aperture dependent upon the difference between a control pressure applied to the valve member and an upstream or downstream pressure.

Fluid regulating devices may comprise systems for adjusting the pressure differential across the valve member by varying the control pressure applied to the valve member. This can be done in dependence on measured upstream and downstream pressures in order to deliver a desired output pressure.

The rate at which the control pressure is changed in response to variations in upstream or downstream pressure determines the sensitivity of the fluid regulating device. In flow regulating systems, it can be advantageous to adjust the sensitivity according to characteristics of the flow regulation implementation. For example, it may be desired to improve valve stability so that the controlled pressure does not overshoot, and then oscillate around, the target pressure. This can be achieved by slowing the rate at which the control pressure is changed, which has the effect of adjusting the speed with which valve member responds.

Smaller volume regulating devices naturally respond more quickly to changes in valve position. Therefore, in smaller devices, more adjustment may be required in order to slow the valve member response to an acceptable rate.

The rate of change of control pressure can be adjusted with the use of a restrictor, arranged within the control fluid flow path, that restricts the control fluid flow path, thereby setting the rate at which control fluid can flow towards and away from the valve member. This has the effect of damping the motion of the valve member.

Although it is possible for individual fixed-size restrictors to be designed for all valve sizes, adjustable restrictors have been implemented that allow the same restrictor to be used for a variety of different valve sizes. One such conventional device uses a multi-turn needle valve that is mounted within the control fluid conduit via a thread such that rotation of the needle valve serves to reduce the area of the conduit through which control fluid is able to flow. This reduces the rate of flow of the control fluid and therefore reduces the sensitivity of the valve member to changes in differential pressure.

However, the Applicant has identified that such devices are unreliable. The use of a multi-turn needle valve not only introduces uncertainty as to the position of the restrictor (and, thus, the extent of the restriction of the control fluid path), but also increases the likelihood of damage to either the restrictor or the control fluid feed owing to over-rotation of the valve beyond its fully-closed configuration (e.g. as a result of operator error). Needle valves are also susceptible to axial float, owing to the clearance required by the thread. This can mean that the position of the needle valve, and thus the restriction, is variable depending on the pressure difference across the needle valve. Such shortcomings can introduce uncertainty into the fluid regulation process and can cause expensive and time-consuming malfunctions.

It is an object of the present invention to provide an improved device for adjusting the sensitivity of a fluid flow control device.

When viewed from a first aspect, the invention provides a device for controlling the flow of fluid through a conduit from an upstream side of the device to a downstream side of the device, the device comprising:

a valve aperture;

a cylindrical mounting member arranged on the downstream side of the valve aperture;

a valve member movably mounted on the outside of the cylindrical mounting member and arranged to move reciprocally to selectively open and close the valve aperture, thereby controlling the flow of the fluid through the valve aperture;

a control volume defined between the cylindrical mounting member and the valve member;

a housing, defining a control fluid feed for introducing a control fluid into the control volume to exert a control pressure on the valve member, wherein the control fluid feed comprises a restriction volume defined by the housing, the restriction volume comprising an inlet and an outlet;

a variable flow restrictor, rotatably arranged within the restriction volume between the inlet and the outlet such that a flow path connecting the inlet and the outlet is defined between an outer surface of the variable flow restrictor and a wall of the restriction volume;

wherein the variable flow restrictor is axi-asymmetric about its axis of rotation such that a cross-sectional area of the flow path in a plane parallel to the axis of rotation varies as the variable flow restrictor is rotated.

Thus the present invention provides a fluid flow control device, actuated by the application of a control fluid into a control volume so as to move a valve member, and comprising a damping arrangement for adjusting the rate at which control fluid is introduced and evacuated from the control volume.

The flow of fluid through the device is controlled between an upstream side of the device and a downstream side of the device, with a valve aperture of the device, for example, defining the boundary between the upstream and downstream sides. The flow of fluid through the valve aperture, and thus through the device from the upstream side to the downstream side, is controlled by a valve member that is movably mounted on the outside of a cylindrical mounting member. The cylindrical mounting member is arranged in the device downstream of the valve aperture (and thus preferably the valve member is arranged downstream of the valve aperture) and the valve member is arranged to move reciprocally on the outside of the cylindrical mounting member to selectively open and close the valve aperture.

Between them, the (e.g. end of the) cylindrical mounting member and the valve member define a control volume. A control fluid is introduced into the control volume via the control fluid feed. The pressure of the control fluid, as well as the pressure of the fluid on the upstream side of the device, acts on the valve member, to bias (e.g. move) the valve member according to the difference between these pressures.

The rate of flow of control fluid into and out of the control volume is adjusted by the orientation of the variable flow restrictor. The control fluid follows the flow path between the inlet and the outlet of the restriction volume. When the variable flow restrictor is rotated within the restriction volume, a cross-sectional area of the flow path changes (i.e. increases or decreases). This is caused by the axi-asymmetry of the variable flow restrictor about its axis of rotation. It will be appreciated that the term axi-asymmetry is intended to exclude geometry that is completely invariant under rotation about a particular axis, but does include geometry having one or more orders of rotational symmetry about said axis.

As a result of the rotation of the axi-asymmetric variable flow restrictor, the flow rate of the control fluid through the flow path, and thus to and from the control volume, increases or decreases accordingly. By decreasing the flow rate of the control fluid into and out of the control volume, the damping of the valve member is increased, so the valve member will open and close more slowly. Conversely, increasing the flow rate of the control fluid into and out of the control volume will decrease the damping of the valve member, causing the valve member to open and close more quickly.

The valve aperture, through which the flow of fluid is controlled by the valve member and onto which the valve member seals when the valve aperture is closed preferably defines the boundary between the upstream side and the downstream side of the device. The valve aperture may have a substantially circular cross-section. Preferably the device has only a single valve aperture.

The device may comprise a casing, comprising a wall in which the valve aperture is defined. The casing may be attached to (and preferably sealed against) the cylindrical mounting member. Preferably the casing comprises an interior volume that substantially surrounds the cylindrical mounting member and the valve member, e.g. the cylindrical mounting member and the valve member are arranged in the interior volume of the casing.

The cylindrical mounting member is arranged on the downstream side of the valve aperture, preferably coaxially with the valve member and the valve aperture. The cylindrical mounting member may have any suitable and desired cross sectional shape (in a directional perpendicular to its axis). Preferably the cylindrical mounting member has the same cross sectional shape as the shape of the valve aperture, e.g. circular. Preferably the cylindrical mounting member comprises a planar end (the end proximal to the valve aperture) against which the (e.g. (inner) end of the) valve member abuts when the valve aperture is fully open.

In some embodiments the device comprises a flange for mounting the device within (or with respect to) the conduit (e.g. for attaching the device to the conduit). The flange may be attached to, e.g. integrally formed with, the casing and/or the cylindrical mounting member. In some embodiments the device comprises a flange at either end (one to which the cylindrical mounting member is attached and the other in which the valve aperture is formed) that are arranged for mounting the device between the upstream and downstream sides of the conduit. Thus, the casing may extend between an upstream flange and a downstream flange.

The cylindrical mounting member may be arranged in the device and with respect to the conduit in any suitable and desired way to allow fluid to flow through the device and into the downstream side of the conduit after passing through the valve aperture.

The valve member, which is movably mounted on the outside of the cylindrical mounting member, may be arranged in the device in any suitable and desired way in which it achieves its purpose of moving in a reciprocal manner to open and close the valve aperture, to thereby control flow of the fluid through the valve aperture. For example the valve member may comprise a sheath on the outside of the cylindrical mounting member. Thus preferably the valve member is mounted coaxially on the outside of the cylindrical mounting member.

In a preferred embodiment the valve member comprises an end cap, e.g. lying substantially in a plane perpendicular to the axis of the valve member and, e.g. parallel to the plane of the valve aperture, that is arranged to open and close the valve aperture, e.g. seal against the valve aperture when closed. Thus in a particularly preferred embodiment the valve member comprises a sheath and an (e.g. disc-shaped) end cap at the end of the sheath (at the end proximal to the valve aperture), wherein the end cap lies substantially in a plane perpendicular to the direction in which the sheath extends. In one embodiment the end cap (e.g. together with the sheath) forms a closed end of the valve member.

Preferably the (e.g. end cap of the) valve member is arranged to seal (when the valve member closes the valve aperture) against the downstream side of the valve aperture, preferably against the downstream planar face of the (e.g. casing that defines the) valve aperture.

The control volume may be defined between the cylindrical mounting member and the valve member in any suitable and desired way. The cylindrical mounting member may be solid, such that the control volume is bounded by the end of the cylindrical mounting member and the (inner) end of the valve member, e.g. the (inner surface of the) end cap. However, in a preferred embodiment the cylindrical mounting member comprises a central bore that forms at least part of the control volume. Preferably the central bore is cylindrical, e.g. coaxial with the cylindrical mounting member and, e.g., having a circular cross section. Thus preferably the cylindrical mounting member comprises a cylindrical annulus.

Providing a hollow cylindrical mounting member, i.e. with a central bore as at least part of the control volume (in addition to the part of the control volume between the end of the cylindrical mounting member and the (inner) end of the valve member), helps to maximise the volume of the control volume (and thus increases the control on the valve member) and also helps to provide a control volume even when the valve member is fully open, e.g. such that the end cap of the valve member is abutting the end of the cylindrical mounting member.

Preferably the control volume is substantially closed (e.g. sealed) from the upstream and/or downstream sides of the conduit, e.g. when the end cap of the valve member forms a closed end of the valve member. This helps to prevent the control fluid from leaking into the conduit. In one embodiment the device comprises a seal between the cylindrical mounting member and the valve member, e.g. in a recess on the outside of the cylindrical mounting member or on the inside of the (e.g. sleeve of the) valve member.

In a preferred embodiment the cylindrical mounting member and the valve member define only a single control volume, e.g. preferably the device has only a single control volume. This helps to simplify the design of the device.

When the cylindrical mounting member comprises a central bore, preferably the device comprises a biasing member, e.g. a (e.g. helical) spring, arranged in the bore within the cylindrical mounting member and arranged to bias the valve member towards the valve aperture. The central bore of the cylindrical mounting member provides a convenient location with a relatively large unobstructed volume into which the biasing member may be located. Thus, in this embodiment, the valve member is acted on by the pressure of the upstream side, the control pressure and the force of the biasing member so as to be moved by the resultant force on the valve member. This may help to reduce instability of the device which causes oscillation of the downstream pressure for a fixed control pressure. In use the biasing member may be arranged to prevent or reduce rebound and/or oscillation of the valve member.

Preferably the biasing member (e.g. a spring) acts on a side of the valve member opposite to the valve aperture. This may enable the biasing member to exert a force on the valve member that opposes the force of the inlet pressure through the valve aperture.

Optional features of the damping system of the present invention will now be described.

The housing defines the control fluid feed, comprising the restriction volume for the variable flow restrictor. The housing may be separate from the cylindrical mounting member or the casing of the device. The housing may be integrally formed with the casing or the cylindrical mounting member. In some embodiments, the housing is attached to an outside surface of the casing or cylindrical mounting member. The housing is arranged such that the control fluid feed is in fluid communication with the control volume. Thus, the control fluid feed may extend beyond the housing through the cylindrical mounting member.

The housing may be provided with a seal between the housing and the outer surface of the casing or cylindrical mounting member so as to prevent control fluid from leaking out of the control fluid feed into the atmosphere.

The restriction volume may be any suitable or desired shape. In some embodiments the restriction volume is a wider portion of the control fluid feed. The housing may define a bore that intersects the control fluid feed. The restriction volume may be located at an intersection between the bore and the control fluid feed, e.g. the bore may comprise the restriction volume.

In some embodiments, the bore extends into the housing to intersect the control fluid feed from an outer surface of the housing. The bore may extend into the housing from a first (proximal) side of the housing. The bore may be a blind hole, e.g. extending into the housing to, or beyond, the depth of the control fluid feed (i.e. the distance between the proximal side of the housing and the control fluid feed). The bore may be a through hole extending through the whole depth of the housing to a second (distal) side of the housing.

In some embodiments, the bore has a substantially circular cross-section. The bore may be substantially cylindrical. The inlet of the restriction volume may be defined at a first intersection between the control fluid feed and the bore. The outlet of the restriction volume may be defined at a second intersection between the control fluid feed and the bore. The inlet and/or the outlet may be defined by an inner wall of the housing that defines the bore. The inlet and the outlet of the restriction volume may be separated around the perimeter (e.g. circumference) of the restriction volume. The inlet and the outlet may be circumferentially separated by 180° around the centre of the restriction volume. The inlet and the outlet may be arranged within the housing at the same distance from the first proximal side of the housing, i.e. the inlet and the outlet may be at the same longitudinal position along the bore. In some embodiments the longitudinal positions of the inlet and the outlet are offset from each other, i.e. different distances from the first proximal side of the housing.

The bore may be arranged to intersect the control fluid feed at any suitable or desired angle. In some embodiments, the bore intersects the control fluid feed perpendicularly, i.e. the control fluid feed and the bore form a right angle at the intersection between the bore and the control fluid feed.

In some embodiments, the variable flow restrictor is disposed within the bore. The variable flow restrictor may extend longitudinally along an axis that is coaxial with the longitudinal axis of the bore (e.g. the longitudinal axis of the restriction volume).

The variable flow restrictor may protrude from the bore, thus projecting from an outside surface of the housing. In embodiments in which the bore extends through the whole depth of the housing, thereby defining a proximal end and a distal end of the bore, the variable flow restrictor may protrude from both the proximal end and the distal end of the bore. In embodiments where the variable flow restrictor projects from an outer surface of the housing, this improves the ease with which the variable flow restrictor may be rotated, whether manually or by an automated actuation arrangement.

The variable flow restrictor may be rotatable about any suitable axis so that a cross-sectional area of the flow path in a plane parallel to the axis of rotation varies as the variable flow restrictor is rotated. In some embodiments, the variable flow restrictor is rotatable about its longitudinal axis. Preferably the variable flow restrictor is freely rotatable, i.e. without being threadedly mounted. This means that the restrictor can be manufactured from softer materials, such as plastics, because the risk of damaging a thread is avoided.

The variable flow restrictor may be arranged within the restriction volume such that it is prevented from moving along its longitudinal axis (i.e. prevented from axial movement). Preferably, the variable flow restrictor is arranged within the restriction volume such that it is only able to rotate about one axis of rotation, e.g. about its longitudinal axis. This helps to ensure that the variable flow restrictor is rotated by the appropriate amount to provide the desired damping effect.

The variable flow restrictor may comprise an adjustment knob for rotating the variable flow restrictor. The adjustment knob may be arranged at a proximal end of the variable flow restrictor, protruding from an outer surface of the housing. The adjustment knob may be wider the bore so that the adjustment knob acts as a stop to prevent movement of the variable flow restrictor along its longitudinal axis (i.e. to prevent axial movement).

The housing and/or the adjustment knob may comprise a display arranged to provide an indication of the flow rate of control fluid through the restriction volume. The display may comprise a dial and an indicator mark. The display may comprise an electronic display, e.g. an LCD display screen or an LED. This means that the damping effect of the variable flow restrictor can be more easily determined by a user.

It will be appreciated that, in contrast to multi-turn restrictors, the present invention provides a restrictor for which the extent of the restriction can be determined from the rotation of the restrictor alone. This means that the damping effect can be more easily determined, whether from a visual inspection of the (e.g. adjustment knob of the) variable flow restrictor or by use of a position sensor, such as a potentiometer.

Rotation of the variable flow restrictor may be manual. In some embodiments, rotation of the variable flow restrictor is automatically (e.g. electronically) controlled. The device may comprise an actuator for rotating the variable flow restrictor. The device may comprise a feedback system electronically connected to the actuator to rotate the variable flow restrictor according to a desired valve sensitivity.

The device may further comprise a flow rate sensor for determining the flow rate of the control fluid through the control fluid feed. The device may comprise a sensor for determining the position and/or velocity of the valve member and/or the variable flow restrictor. The sensor may be a potentiometer. It will be appreciated that the variable flow restrictor is not reliant on being a multi-turn device, unlike conventional restrictors. This means that sensors such as potentiometers may be more easily used to determine the restrictor's position. Sensor measurements may be used by the feedback system to control the flow rate imposed by the variable flow restrictor, e.g. the sensor may be connected (and provides its output) to the feedback system.

The (e.g. adjustment knob of the) variable flow restrictor may comprise a limiter (e.g. a protrusion or notch) for preventing rotation of the variable flow restrictor beyond a predetermined range. The housing may comprise a corresponding feature (e.g. protrusion or notch) arranged to abut the limiter at the limits of this range so as to prevent further rotation of the variable flow restrictor. It will be appreciated that, even if the limiter were to be overridden and the variable flow restrictor rotated beyond this predetermined range, operation of the variable flow restrictor would preferably not be impeded. This is in contrast with conventional restrictors, such as needle valves, for which over-rotation can damage the restrictor and hinder its effectiveness.

The variable flow restrictor may comprise a radially projecting stop to prevent axial (longitudinal) movement of the variable flow restrictor. The stop may be arranged to abut an outer surface of the housing. The stop may be arranged on a distal end of the variable flow restrictor. The stop may be arranged on a portion of the distal end of the variable flow restrictor that protrudes from a distal end of the bore. In some embodiments, a stop is provided on both the proximal and the distal ends of the variable flow restrictor so as to prevent axial (longitudinal) movement of the variable flow restrictor in any direction. This helps to retain the variable flow restrictor within the restriction volume (e.g. within the bore). The (e.g. outer surface of the) variable flow restrictor and the housing may comprise interlocking features for preventing axial (longitudinal) movement of the variable flow restrictor In some embodiments, the variable flow restrictor extends through the full depth of the housing. In some embodiments, the distance that the variable flow restrictor extends into the bore of the housing is less than the distance (i.e. the depth) that the bore extends into the housing. Thus, in some embodiments, a flow chamber is defined between a distal end of the variable flow restrictor and a wall of the housing (i.e. a distal end of the bore). In some embodiments, the flow chamber is in fluid communication with the flow path.

In some embodiments, an outer surface of the variable flow restrictor defines a perimetrically (e.g. circumferentially) extending groove in the outer surface of the variable flow restrictor. The groove may extend around the entire perimeter (e.g. circumference) of the variable flow restrictor. In some embodiments, the groove extends around a portion of the variable flow restrictor.

In embodiments in which the inlet and outlet of the restriction volume are perimetrically (e.g. circumferentially) separated, the groove may extend around the perimeter (e.g. circumference) by the distance by which the inlet and the outlet are perimetrically (e.g. circumferentially) separated.

The groove, together with the housing, may define a portion of the flow path, i.e. the flow path may follow the groove around the perimeter (e.g. circumference) of the variable flow restrictor.

The groove may be longitudinally offset from the inlet and/or the outlet of the restriction volume. In other words, the groove and the inlet/outlet may be at different depths into the housing. This means that, where the groove defines a portion of the flow path, the control fluid may be required to flow in a longitudinal direction along an outer surface of the variable flow restrictor before and/or after flowing along the groove.

Thus, the width (e.g. diameter) of the variable flow restrictor may be less than the width (e.g. diameter) of the restriction volume (e.g. the bore) so as to define a portion of the flow path therebetween. This can be beneficial to ensure that, even if the variable flow restrictor is set incorrectly, the fluid flow control device will still operate to an extent. Furthermore, allowing a clearance between the outer surface of the variable flow restrictor and the wall of the housing means that there is less frictional resistance when rotating the variable flow restrictor.

In some embodiments, the device comprises a liner arranged between the variable flow restrictor and an inner wall of the housing. This can help to reduce the friction between the variable flow restrictor and the housing. Furthermore, positioning a liner between the variable flow restrictor and the housing means that the housing can be manufactured (e.g. cast) with a higher surface roughness more quickly and/or more cheaply.

In some embodiments, the flow path around the variable flow restrictor between the inlet and the outlet has no longitudinal component, i.e. the control fluid is arranged only to flow around the perimeter (e.g. circumference) of the variable flow restrictor. In some embodiments, the flow path has a longitudinal component. The flow path may comprise the flow chamber and/or the groove.

The device may comprise a seal arranged between an outer surface of the variable flow restrictor and the housing, e.g. at or towards the proximal and/or distal end of the bore. This can help to prevent control fluid from leaking out of the control fluid feed into the atmosphere (e.g. via the bore).

It will be appreciated that control fluid can flow along the flow path towards the control volume and/or away from the control volume. Thus, the restriction volume and the variable flow restrictor may be arranged downstream or upstream of the control volume depending on the direction of flow of the control fluid.

The variable flow restrictor may be manufactured from any suitable and/or desired material. In some embodiments, the variable flow restrictor is plastic. The variable flow restrictor may be manufactured by injection moulding. In some embodiments the variable flow restrictor is metal.

The variable flow restrictor may be axi-asymmetric about its longitudinal axis. In some embodiments, the variable flow restrictor is axi-symmetric along the length of the variable flow restrictor apart from an axi-asymmetric portion of the variable flow restrictor that is arranged within the restriction volume between the inlet and the outlet. Preferably, the flow path is defined between this axi-asymmetric portion of the variable flow restrictor and the housing.

The variable flow restrictor may comprise a restriction feature that provides the axi-asymmetry of the variable flow restrictor. The variable flow restrictor may be arranged within the restriction volume such that the flow path connecting the inlet and the outlet is defined between the (outer surface of the) restriction feature and the wall of the restriction volume.

The restriction feature may comprise a radial protrusion from the outer surface of the variable flow restrictor. The restriction feature may comprise a radial cut-out in the outer surface of the variable flow restrictor. The cut-out may extend perimetrically (e.g. circumferentially) around a portion of the outer surface of the variable flow restrictor. The cut-out may extend circumferentially by the distance by which the inlet and the outlet are perimetrically (e.g. circumferentially) spaced. The depth (i.e. in a direction from the outer surface of the variable flow restrictor towards the axis of rotation of the variable flow restrictor) of the cut-out may vary along the length of the cut-out around the perimeter (e.g. circumference) of the variable flow restrictor.

In some embodiments, the restriction feature comprises a pair of diametrically opposed lobes, each extending radially from a central point (e.g., from the axis of rotation of the variable flow restrictor). The restriction feature may comprise a pair of diametrically opposed spiral portions (e.g. thus resembling a tilde). In some embodiments a cross-section of the restriction feature in a plane perpendicular to the axis of rotation of the variable flow restrictor has rotational symmetry. In some embodiments, the cross-section of the restriction feature has two-fold (i.e. 180°) rotational symmetry. This means that rotation of the variable flow restrictor can restrict the flow through the inlet and the outlet simultaneously. Covering and uncovering both the inlet and the outlet at the same time, rather than only one, allows for a larger flow passage area for a given restriction valve flow coefficient. The rotationally symmetric design has the further benefit that the variable flow restrictor self-centres within the restriction volume. This means that the variable flow restrictor is more insensitive to a pressure differential between the inlet and the outlet of the restriction volume. This can help to avoid hysteresis when the flow of the control fluid is reversed.

The restriction feature may extend longitudinally along the variable flow restrictor. The restriction feature may not extend along the full length of the variable flow restrictor. In some embodiments the restriction feature extends along the length of the variable flow restrictor from one side of the restriction volume to the other. In other words, the restriction feature may extend longitudinally along the variable flow restrictor only within bounds of the restriction volume.

In some embodiments, the control fluid comprises a fluid pressure, e.g. a gas pressure. The control fluid feed could be arranged to introduce a fixed control pressure into the control volume. However, in a preferred set of embodiments the control fluid feed comprises a control arrangement for controlling a control pressure in the control volume. The arrangement may comprise any conventional pressure regulating device, e.g. a pilot pressure regulator or a solenoid valve.

The control pressure set by the control arrangement, e.g. the pilot pressure regulator, may be derived from an external secondary source, e.g. an air supply which is controlled using a valve, tap, knob, etc., or even remotely, or the control pressure may be regulated directly from the pressure upstream and/or downstream from the device, e.g. via the control arrangement, e.g. the pilot pressure regulator.

In one embodiment the control arrangement is in fluid communication with the downstream side of the device and arranged to set the control pressure dependent on the downstream pressure. This configuration may be used when it is desired to maintain the downstream pressure.

In another embodiment the control arrangement is in fluid communication with the upstream side of the device and arranged to set the control pressure dependent on the upstream pressure. In a further embodiment the control arrangement is in fluid communication with the upstream and downstream sides of the device and arranged to set the control pressure dependent on the upstream and/or downstream pressure, e.g. including dependent on the pressure difference between the upstream and downstream sides of the device.

When the control arrangement is arranged to set the control pressure dependent on the upstream and/or downstream pressure within the conduit, the control arrangement may be configured to be in fluid communication with the upstream and/or downstream pressure respectively in any suitable and desired way. In a preferred embodiment the device comprises a duct therethrough, wherein the control arrangement senses the upstream and/or downstream pressure via the duct. Thus preferably the duct is in fluid communication with the control arrangement and the upstream and/or downstream side of the device as appropriate.

In a particularly preferred embodiment the control arrangement comprises a control fluid line, e.g. through the duct, from the upstream side of the device to the downstream side of the device, e.g. that bypasses the (main flow path through the) valve aperture. Preferably the, e.g., pilot pressure regulator controls the flow through the control fluid line so to set the control pressure. Preferably the control pressure is set, e.g. by the pilot pressure regulator, from a branch off the control fluid line through the control arrangement that is in fluid communication with the control fluid feed (and, as discussed, may be dependent upon one or both of the upstream and downstream pressures).

In one embodiment the control arrangement is arranged to create a pressure drop therethrough, e.g. in the control fluid line through the control arrangement. The pressure drop (e.g. dependent on the rate of fluid flow through the control fluid line in the control arrangement) preferably allows the control pressure to be set dependent on pressure drop. For example, a greater pressure drop when there is greater flow through the control fluid line may cause the control pressure to be lower than the upstream pressure (which thus causes the valve member to open the valve aperture), e.g. the pressure differential between the control and the upstream pressures preferably depends on the pressure drop.

The pressure drop through the control arrangement may be achieved in any suitable and desired way, e.g. in a pilot pressure regulator itself. In a preferred embodiment the duct (through which the upstream or downstream pressure is sensed by the control arrangement) and/or the control fluid line through the control arrangement itself comprises a reduced cross sectional area (compared to another portion of the duct or control fluid line), e.g. an orifice, that is arranged to induce a pressure drop.

In a particularly preferred embodiment the pressure drop is in the control fluid line through the control arrangement upstream of the pilot pressure regulator. The variable flow restrictor, in the control fluid feed, can, and preferably does, provide a further pressure drop between the control fluid line and the control volume of the device. This pressure drop can be adjusted by the rotation of the variable flow restrictor and the change in cross-sectional area of the flow path through the control fluid feed that this causes. This can help to limit the flow rate in and out of the control volume and thus help to regulate the changes in the control pressure, e.g. owing to changes in the upstream and/or downstream pressures, such that the rate of the valve member opening and closing may be controlled.

The Applicant considers this system for damping the valve member of the fluid flow control device to be novel and inventive in its own right. Thus, when viewed from a second aspect, the invention provides a damping system for a fluid flow control device, the damping system comprising:

a housing, defining a control fluid feed for introducing a control fluid to a control volume of the fluid flow control device, wherein the control fluid feed comprises a restriction volume defined by the housing, the restriction volume comprising an inlet and an outlet; and a variable flow restrictor, rotatably arranged within the restriction volume between the inlet and the outlet such that a flow path connecting the inlet and the outlet is defined between an outer surface of the variable flow restrictor and a wall of the restriction volume;

wherein a cross-section of the variable flow restrictor in a plane perpendicular to the axis of rotation comprises two diametrically opposed lobes extending from the axis of rotation of the variable flow restrictor such that a cross-sectional area of the flow path in a plane parallel to the axis of rotation varies as the variable flow restrictor is rotated.

Thus it will be appreciated that this aspect of the present invention provides a valve damping system that is operable to adjust the rate of flow of control fluid into a control volume of the valve. Rotation of the variable flow restrictor serves to restrict or to widen a flow path between a control fluid source and the control volume, thereby controlling the rate at which control fluid may flow into or out of the control volume.

Reducing the control fluid flow rate into or out of the control volume acts to slow the speed at which the valve responds to changes in upstream pressure. This can be useful for increasing valve stability. Conversely, increasing the control fluid flow rate acts to increase the speed at which the valve responds to changes in upstream pressure. Thus, by rotating the variable flow restrictor of the present invention, the response of the valve member can be tuned as required.

As will be appreciated by those skilled in the art, this aspect of the present invention can, and preferably does include any one or more or all of the preferred and optional features of the present invention discussed herein, as appropriate.

Certain preferred embodiments for the invention will now be described, by way of example only, with reference to the accompanying drawings in which:

FIG. 1 shows a cross-section of a fluid flow regulating device comprising a variable flow restrictor in accordance with an embodiment of the present invention;

FIGS. 2A and 2B respectively show side and end elevation cross-sections of the variable flow restrictor of FIG. 1 in a restricted configuration;

FIGS. 3A and 3B respectively show side and end elevation cross-sections of the variable flow restrictor of FIGS. 1 and 2 in a less restricted configuration;

There are many industrial situations in which it is desirable to operate a control valve in order to regulate the flow of fluid through a pipe or conduit. In such systems, a valve member is arranged to respond to a pressure differential between a control pressure and an upstream or downstream pressure, which may fluctuate in time. As will now be described, embodiments of the present invention provide devices that are able to adjust the sensitivity of the valve member's response.

Figure 1:
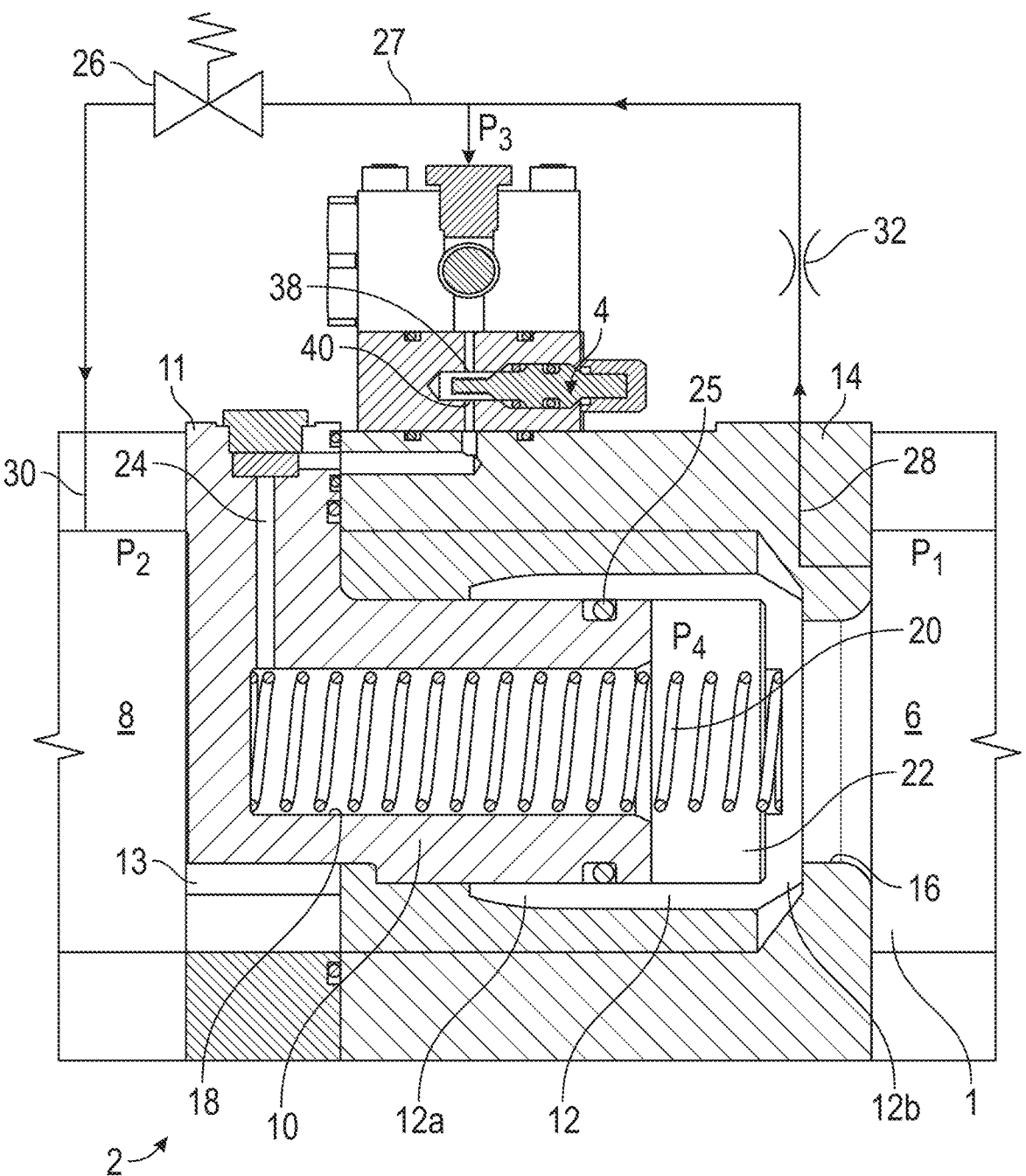

FIG. 1 shows a cross-sectional view of a fluid flow regulating device 2 comprising a variable flow restrictor 4 in accordance with an embodiment of the invention.

In FIG. 1 the fluid flow is from right to left through an upstream side 6 of a conduit 1, through the device 2 and into a downstream side 8 of the conduit 1. The device 2 comprises three main components: a cylindrical mounting member 10, a valve member 12 and a housing 14 that defines a valve aperture 16. The cylindrical mounting member 10 is integrally formed with, and projects perpendicularly from, a flange 11 that is used to mount the device 2 in the conduit 1. The housing 14 is attached to and sealed against the flange 11 by means of a number of bolts (not shown). The housing 14 and the flange 11 are machined and attached to each other so that the valve member 12 is precisely aligned with the valve aperture 16.

The valve member 12, which has a cylindrical sheath portion 12a and an end cap 12b, is mounted on the outside of the cylindrical mounting member 10 such that it is able to move reciprocally along the outer surface of the cylindrical mounting member 10. The valve member 12 can thus move between a position in which the end cap 12b is sealed against the inner face of the housing 14 to fully close the valve aperture 16 (as shown in FIG. 1), and a position in which an inner surface of the end cap 12b abuts an upstream surface of the cylindrical mounting member 10, leaving the valve aperture 16 fully open. Apertures 13 in the flange 11 allow a flow path for fluid from the inside of the housing 14 into the downstream side 8 of the conduit 1.

The cylindrical mounting member 10 has a hollow central bore 18 in which a helical spring 20 is located. The spring 20 is positioned between a downstream inner surface of the central bore 18 and the end cap 12b of the valve member 12. Between them, the valve member 12 (i.e. its cylindrical sheath portion 12a and end cap 12b) and the cylindrical mounting member 10 (with its hollow central bore 18) define a control volume 22, which is sealed by an annular seal 25 that is located in a groove on the outside of the housing. The control volume 22 has a central portion within the hollow central bore 18 of the cylindrical mounting member 10 and a portion with a greater cross-sectional area adjacent the end cap 12b of the valve member 12, i.e. beyond the end of the cylindrical mounting member 10.

A duct 24 that is drilled through the flange 11 and housing 14 provides fluid communication between the control volume 22 and a pilot pressure regulator 26 (shown schematically) to allow the pilot pressure regulator 26 to introduce, i.e. to set, a control pressure in the control volume 22. A second duct 28 that is drilled through the housing 14 provides the pilot pressure regulator 26 with fluid communication with the upstream side 6 of the conduit 1. A third duct 30 that is drilled through the flange 11 (although, for the purposes of clarity, this is shown schematically in FIG. 1 as entering directly into the downstream side 8 of the conduit 1) provides the pilot pressure regulator 26 with fluid communication with the downstream side 8 of the conduit 1, so that the pilot pressure regulator 26 can use the upstream and downstream pressures to set the control pressure in the control volume 22, as will be described.

As shown schematically in FIG. 1, the pilot pressure regulator 26 is arranged in a control loop 27 on the outside of the conduit 1 and is arranged to deliver a control pressure $P_3$ to the device 2 via the duct 24 into the control volume 22.

The pilot pressure regulator 26 is also in fluid communication with the upstream pressure $P_1$ on the upstream side 6 of the conduit 1 via the duct 28 through the housing 14, and in fluid communication with the pressure $P_2$ on the downstream side 8 of the conduit 1 via the duct 30. This provides a fluid flow path through the control loop 27 that bypasses the valve aperture 16 of the device 2. The pilot pressure regulator 26 is positioned in this fluid flow path of the control loop 27, with the duct 24 into the control volume 22 branching off upstream of the pilot pressure regulator 26.

The control loop 27 also includes an orifice 32 that provides a restriction in the duct 28 between the upstream side 6 of the conduit 1 and the pilot pressure regulator 26 (such that the pressure in the control loop 27 downstream of the orifice 32 is $P_3$).

The duct 24 between the control volume 22 and the pilot pressure regulator 26 extends predominantly radially through the flange 11 and housing 14 of the device 2, into a control block 34 arranged on an external surface of the housing 14. The control block 34 is shown in more detail in FIGS. 2A to 3B.

Figure 2A:
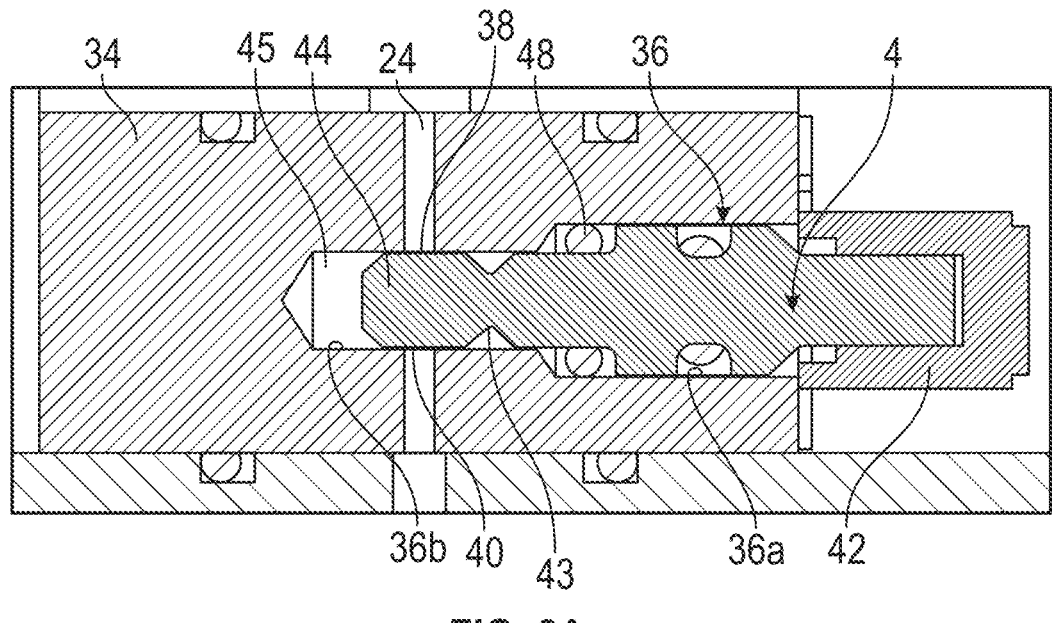

FIG. 2A shows a side elevation cross-section of the control block 34. The control block 34 comprises a bore 36 that extends into the control block 34 in a direction perpendicular to the duct 24, such that the bore 36 intersects and passes perpendicularly through the duct 24. Thus, control fluid flowing through the duct 24 to the control volume 22 enters the bore 36 through a first aperture 38 in the duct 24 and leaves the bore 36 through a second aperture 40 in the duct 24.

The variable flow restrictor 4 is arranged within the bore 36. The variable flow restrictor 4 is substantially cylindrical and comprises an adjustment knob 42, arranged on a proximal end of the variable flow restrictor 4 such that it protrudes out of the bore 36 of the control block 34, and a restriction feature 44, arranged on a distal end of the variable flow restrictor 4. The restriction feature 44 is arranged between the first and second apertures 38, 40 in the duct 24.

The bore 36 comprises a proximal portion 36a and a narrower distal portion 36b. The duct 24 is arranged to intersect the narrower distal portion 36b of the bore 36. A circumferentially extending groove 43 is defined on the surface of the variable flow restrictor 4, adjacent, and on the proximal side of, the restriction feature 44. Along the length of the variable flow restrictor 4, the diameter of the variable flow restrictor 4 is less than the corresponding diameter of the bore 36. This reduces the friction between the variable flow restrictor 4 and the control block 34 when the variable flow restrictor 4 is rotated. Furthermore, the gap between the outer surface of the variable flow restrictor 4 and the wall of the bore 36 provides a first fluid flow path between the first aperture 38 of the bore 24, the circumferentially extending groove 43 and the second aperture 40.

The variable flow restrictor 4 is arranged so that it does not extend along the full depth of the bore 36. Thus, the distal end of the variable flow restrictor 4 and the control block 34 together define a chamber 45. A second fluid flow path is therefore defined between the first aperture 38 of the bore 24, the chamber 45 and the second aperture 40. This means that fluid flowing through the bore 24 is turned through a right angle to follow the length of the variable flow restrictor 4 until the flow reaches either the circumferentially extending groove 43 (by following the first fluid flow path) or the chamber 45 (by following the second fluid flow path). Having passed either along the groove 43 or through the chamber 45, the fluid then returns along the length of the variable flow restrictor 4 (in the opposite direction) before flowing through the second aperture 40 of the duct 24, towards the control volume 22.

An O-ring seal 48 is arranged around the circumference of the variable flow restrictor 4 in the proximal portion 36a of the bore 36. The seal 48 prevents the leakage of fluid from the first or second fluid flow paths out of the bore 36.

Figure 2B:
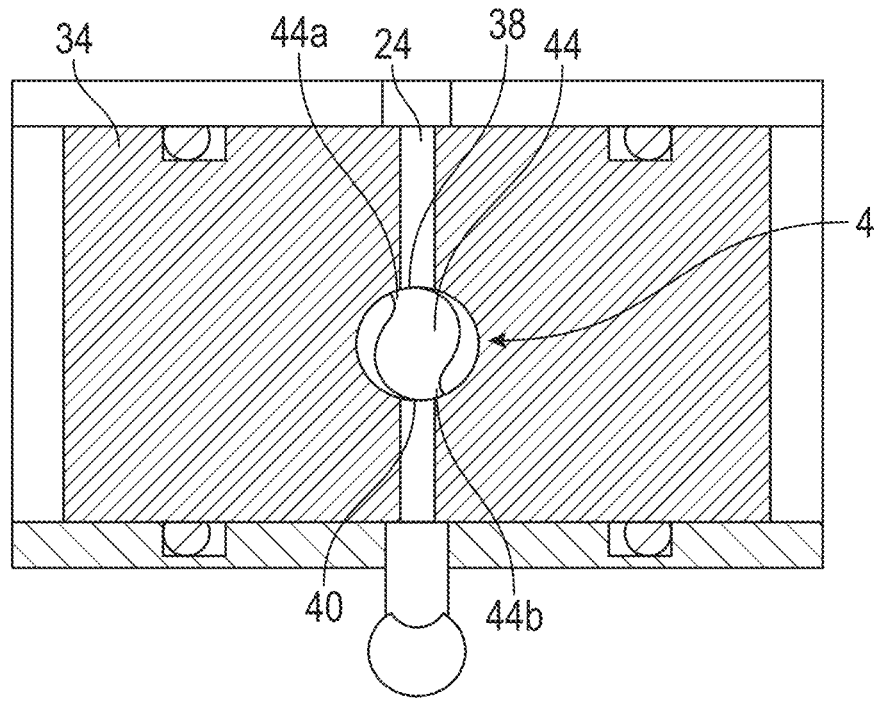

FIG. 2B shows an end elevation cross-section of the variable flow restrictor 4 when viewed from the downstream side 8 of the device 2. As can be seen, the restriction feature 44 has a cross-section comprising a first spiral portion 44a and a second spiral portion 44b, diametrically opposed and each extending radially from a central point (i.e. thus resembling a tilde). The spiral portions 44a, 44b extend longitudinally along the variable flow restrictor 4 from the distal end of the restrictor 4 to the circumferentially extending groove 43.

It will be appreciated that rotation of the variable flow restrictor 4 (by rotating the adjustment knob 42) about the longitudinal axis of the variable flow restrictor 4 causes the spiral portions 44a, 44b to move relative to the first and second apertures 38, 40 in the duct 24.

In the configuration shown in FIGS. 2A and 2B, the variable flow restrictor 4 is arranged such that the first spiral portion 44a is adjacent the first aperture 38 and the second spiral portion 44b is adjacent the second aperture 40. In this configuration, the distance between the outer perimeter of the restriction feature 44 (i.e. the tips of the spiral portions 44a, 44b) and the first and second apertures 38, 40 is small, meaning that the flow rate of fluid passing through the duct 24, around the variable flow restrictor 4, will be low.

However, if the variable flow restrictor 4 is rotated (e.g. up to ninety degrees) about its longitudinal axis (by rotating the adjustment knob 42), the spiral portions 44a, 44b are moved away from the first and second apertures 38, 40 of the duct 24. This configuration is shown in FIGS. 3A and 3B.

Figure 3A:
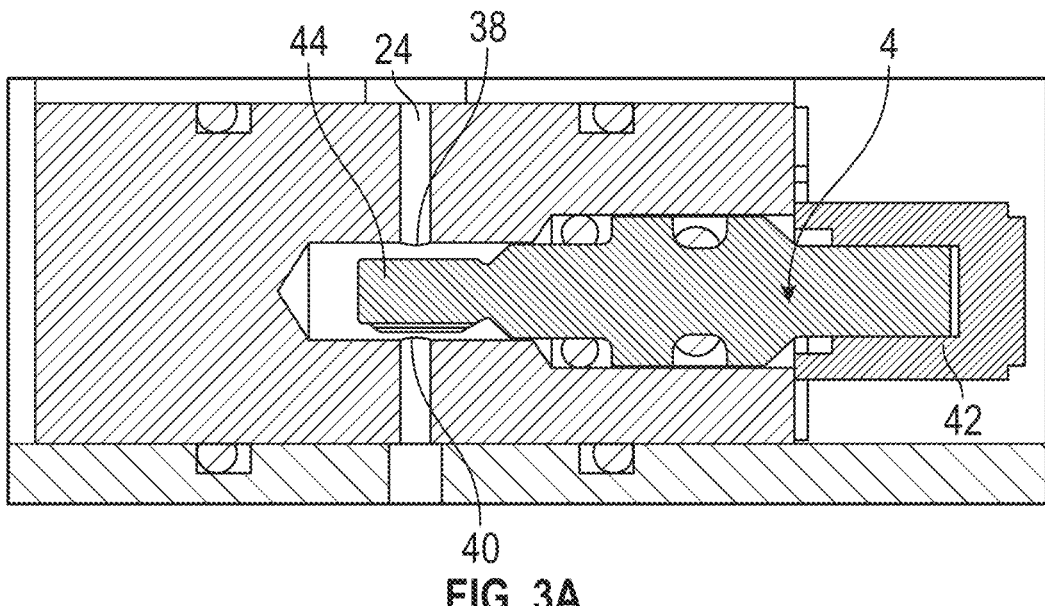
Figure 3B:
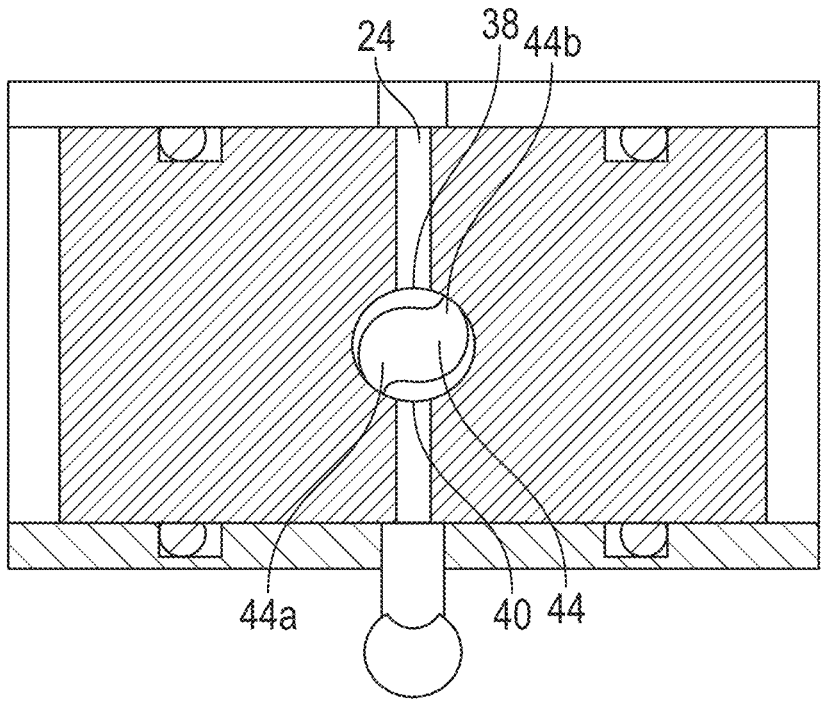

FIG. 3A shows a side elevation cross-section of the variable flow restrictor 4 of FIGS. 1, 2A and 2B in a less-restricted configuration, in which the variable flow restrictor 4 has been rotated by the adjustment knob 42 in a clockwise direction (when viewed from the adjustment knob 42) about its longitudinal axis. FIG. 3B shows an end elevation cross-section of the variable flow restrictor 4 in this configuration when viewed from the downstream side 8 of the device 2. As can be seen, the radial distance between the perimeter of the restriction feature 44 and the first and second apertures 38, 40 of the duct 24 is greater in this configuration than in the restricted configuration shown in FIGS. 2A and 2B. Thus, there is a greater cross-sectional area for the fluid to flow through, meaning that the flow rate of fluid passing through the duct 24, around the variable flow restrictor 4, will be higher.

It will be appreciated that the extent to which the first and second apertures are closed by the spiral portions 44a, 44b of the restriction feature 44 may be adjusted by varying the rotation of the variable flow restrictor 4, thus controlling the flow rate of fluid through the duct 24. Rotating the adjustment knob 42 in a clockwise direction results in a gradual increase in the radial distance between the perimeter of the restriction feature 44 and the first and second apertures 38, 40. This means that the flow rate can be adjusted gradually between a minimum and a maximum flow rate.

The adjustment knob 42 knob comprises a stop (not shown) that is arranged to abut corresponding stops (not shown) on the control block 34 at the circumferential positions corresponding to the minimum and maximum flow rates (i.e. separated by approximately 90°). This prevents the knob 34 from being rotated anti-clockwise from the restricted configuration to a less-restricted configuration, which would result in a step change in flow rate rather than a gradual increase. This also increases the ease with which the variable flow restrictor 4 can be rotated to the minimum and maximum flow rate positions, i.e. without overshooting these positions. The adjustment knob 42 comprises markings to indicate to the user the flow rate corresponding to the rotational position of the knob 42.

Operation of the device 2 will now be described with reference to FIGS. 1 to 3B. In this example, the pilot pressure regulator 26 is set dependent on the pressure $P_2$ in the downstream side 8 of the conduit 1 (though it will be appreciated that other arrangements are possible). With no flow of fluid through the conduit 1 of the device 2, i.e. a low upstream and downstream pressure in the conduit 1, the control pressure in the control volume 22 and the spring force of the spring 20 act on the end cap 12b of the valve member 12 to bias the valve member 12 into a position in which the end cap 12b is sealed against the inner face of the housing 14 to fully close the valve aperture 16.

When fluid flow commences in the conduit 1, the fluid will flow in the upstream side 6 of the conduit 1 and exert a force against the end cap 12b of the valve member 12 owing to the pressure $P_1$ in the upstream side 6 of the conduit 1. The upstream pressure $P_1$ will also create a flow of fluid through the control loop 27, such that the flow through the orifice 32 creates a pressure drop across it, i.e. $P_1$-$P_3$. This pressure drop causes the pressure $P_4$ in the control volume 22 to be lower than the pressure $P_1$ in the upstream side 6 of the conduit 1, which causes the valve member 12 to be pushed back from and to open the valve aperture 16, allowing flow of the fluid through the valve aperture 16, through the device 2 and into the downstream side 8 of the conduit 1 via the apertures 13 in the flange 11.

While the upstream pressure $P_1$ maintains such a value, the valve member 12 will keep the valve aperture 16 at least partially open and thus allow fluid to flow through the device 2. When the upstream pressure $P_1$ increases, the effect will be two-fold. First, the increased upstream pressure $P_1$ will act on the end cap 12b of the valve member 12 to push it back against the control pressure $P_4$ in the control volume 22 and thus open the valve aperture 16 further. However, simultaneously, owing to the flow through the device 2, the downstream pressure $P_2$ will also increase. This increase in the downstream pressure $P_2$ which is used to set the pilot pressure regulator 26, causes the pilot pressure regulator 26 to close and this decreases the fluid flow through (and increases the pressure $P_3$) in the control loop 27. This causes the pressure drop across the orifice 32 to be smaller, which will accordingly set a higher control pressure $P_4$ (relative to the upstream pressure $P_1$) in the control volume 22. This increased control pressure $P_4$ will thus balance against the increased upstream pressure $P_1$ such that the valve member 12 settles (i.e. closes) to a position where it is pressure balanced. This will thus act to regulate the pressure that is experienced in the downstream side 6 of the conduit 1.

The action of the variable flow restrictor 4 is to limit the flow rate into and out of the control volume 22 to thus regulate the change in the control pressure $P_4$ so that the rate of the valve member 12 opening and closing may be controlled.

With the variable flow restrictor 4 in its least restrictive configuration (i.e. with the variable flow restrictor 4 arranged such that the distance between the spiral portions 44a, 44b of the restriction feature 44 and the first and second apertures 38, 40 is at a maximum, as shown in FIGS. 3A and 3B), the flow rate of the fluid into the control volume 22 from the control loop 27 is at its highest. Thus, this configuration corresponds to the fastest speed at which the pressure $P_4$ in the control volume 22 will balance with the upstream pressure $P_1$, i.e. the fastest speed at which the valve member 12 will respond to a change in upstream pressure $P_1$. It will be appreciated that this is the least damped configuration.

As the variable flow restrictor 4 is rotated from this least restrictive configuration through to its most restrictive configuration (i.e. with the variable flow restrictor 4 arranged such that the spiral portions 44a, 44b are immediately adjacent the first and second apertures 38, 40, as shown in FIGS. 2A and 2B), the flow rate of the fluid into the control volume 22 from the control loop 27 is at its lowest. Thus, this configuration corresponds to the slowest speed at which the pressure $P_1$ in the control volume 22 will balance with the upstream pressure $P_1$, i.e. the slowest speed at which the valve member 12 will respond to a change in upstream pressure $P_1$. It will be appreciated that this is the most damped configuration.

Figure 4:
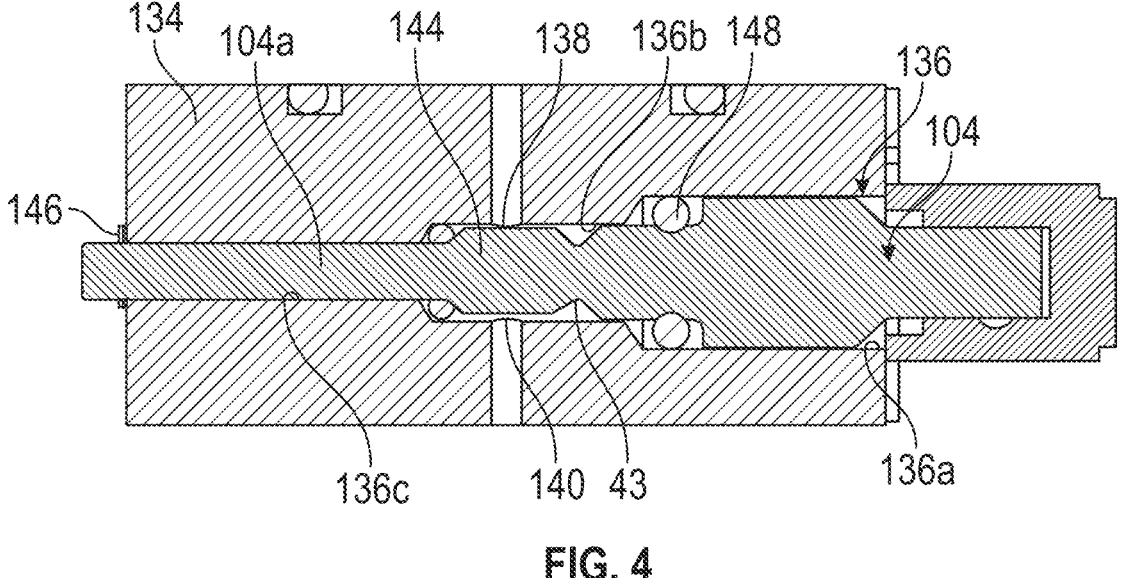
FIG. 4 shows a side elevation cross-section of a variable flow restrictor in accordance with another embodiment of the present invention.

FIG. 4 shows a side elevation cross-section of a variable flow restrictor 104, arranged within a bore 136 of a control block 134, in accordance with another embodiment of the present invention.

The control block 134 is essentially the same as the control block 34 shown in FIGS. 1 to 3B and described above, except that the bore 136 of the variable flow restriction 104 that extends into the control block 134 in a direction perpendicular to the duct 124 extends all the way through the control block 134. The bore 136 comprises a proximal portion 136a, a first distal portion 136b and a second distal portion 136c. The second distal portion 136c is narrower than the first distal portion 136b, and both the first and second distal portions 136b,c are narrower than, and coaxial with, the proximal portion 136a. The second distal portion 136c extends from the distal end of the first distal portion 136b.

The duct 124 is arranged to intersect the first distal portion 136b of the bore 136. The variable flow restrictor 104 is essentially the same as the variable flow restrictor 4 shown in FIGS. 1 to 3B and described above, except that the variable flow restrictor 104 comprises a distal portion 104a that extends distally from the restriction feature 144 of the variable flow restrictor 104 through the second distal portion 136c of the bore 136 and protrudes from the distal end of the second distal portion 136c of the bore 136. A pin 146 extends radially from the portion of the variable flow restrictor 104 that protrudes from the bore 136. The pin 146 can be inserted into a corresponding radial bore through the distal end of the variable flow restrictor 104 after the variable flow restrictor 104 has been inserted into the bore 136 during assembly of the device 2.

Along the length of the variable flow restrictor 104, the diameter of the variable flow restrictor 104 is less than the corresponding diameter of the bore 136. This reduces the friction between the variable flow restrictor 104 and the control block 134 when the variable flow restrictor 104 is rotated. Furthermore, a first fluid flow path is defined between the first aperture 138 of the bore 124, the circumferentially extending groove 143 and the second aperture 140.

A first O-ring seal 148 is arranged around the circumference of the variable flow restrictor 104 in the proximal portion 136a of the bore 136. A second O-ring seal 149 is arranged around the circumference of the flow restrictor 104 in the first distal portion 136b of the bore 136 between the restriction feature 144 and the distal portion 104a of the variable flow restrictor 104. The seals 148, 149 prevent the leakage of fluid from the first or second fluid flow paths out of the bore 136.

The embodiment shown in FIG. 4 provides a pressure balanced design in which the forces acting on the variable flow restrictor 104 to force the variable flow restrictor 104 out of the bore 136 (owing to the flow of fluid around the variable flow restrictor) are reduced. The pin 146 abuts the wall of the control block 134 to prevent axial movement of the variable flow restrictor 104 out of the bore 136 caused by the fluid pressure.

Figure 5A:
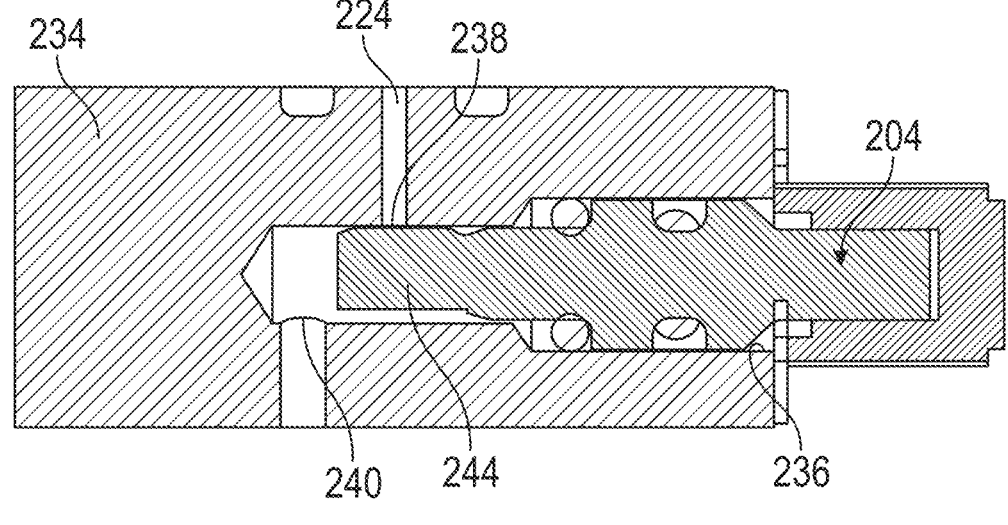
FIGS. 5A and 5B show side and end elevation cross-sections of a variable flow restrictor in accordance with another embodiment of the present invention in a near-closed configuration.

FIG. 5A shows a side elevation cross section of a variable flow restrictor 204 arranged within a bore 236 of a control block 234, in accordance with another embodiment of the present invention.

The control block 234 is similar to the control block 34 shown in FIGS. 1 to 3B and described above, except that the first aperture 238 and the second aperture 240 of the duct 224 are longitudinally offset along the axis of rotation of the variable flow restrictor 204.

The variable flow restrictor 204 is essentially the same as the variable flow restrictor 4 shown in FIGS. 1 to 3B, except that the variable flow restrictor 204 comprises an alternative restriction feature 244. The restriction feature 244 is arranged adjacent the first aperture 238 in the duct 224.

Figure 5B:
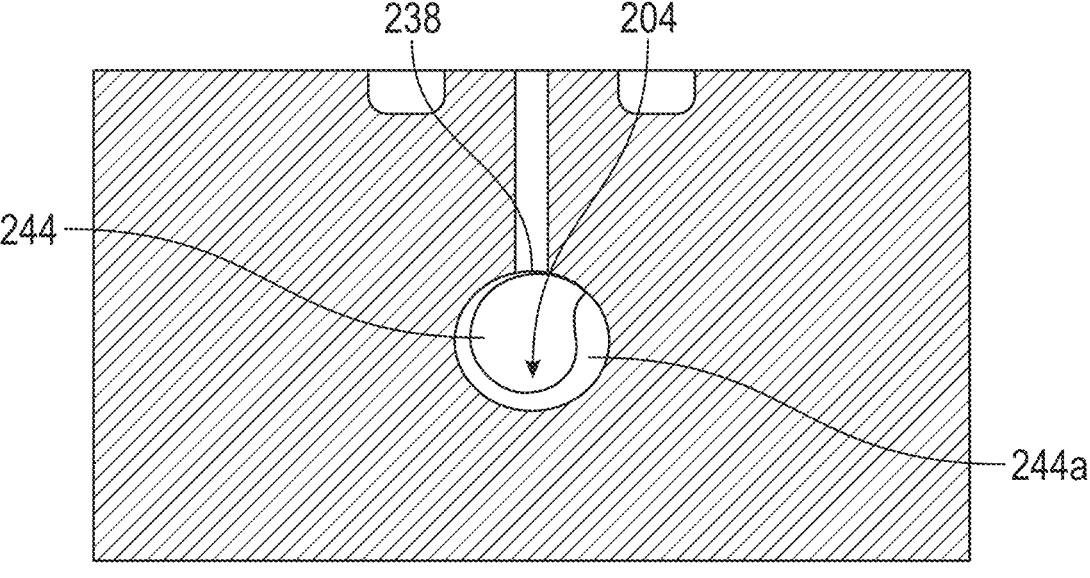

FIG. 5B shows an end elevation cross-section of the variable flow restrictor 204 shown in FIG. 5A. As can be seen, the restriction feature 244 has a cross-section that is substantially circular but comprises a cutaway 244a that extends around the circumference of the cross-section. The cutaway 244a has a depth that varies continuously from a maximum depth at one end of the cutaway 244a (i.e. at 0° around the cross-section) to a depth of zero at the other end (i.e. at approximately 300° around the cross-section). Thus, the cross-section of the restriction feature 244 loosely resembles a comma.

The variable flow restrictor 204 is rotatable to increase or decrease the extent to which the first aperture 238 is restricted by the variable flow restrictor 204. Owing to the variation in depth of the cutaway 244a around the circumference of the variable flow restrictor 204, rotation of the restrictor 204 causes the distance between the first aperture 238 and the outer surface of the variable flow restrictor 204 to change, thus restricting (or widening) the flow path of control fluid between the first aperture 238 and the second aperture 240.

In FIGS. 5A and 5B, the variable flow restrictor 204 is shown in a near-closed configuration. As can be seen in FIG. 5B, the restrictor 204 is arranged such that the distance between the first aperture 238 and the outer surface of the variable flow restrictor 204 is small. This means that the flow path connecting the first aperture 238 and the second aperture 240 (shown in FIG. 5A) is restricted, corresponding to a high level of damping of the valve member 12.

Figure 6A:
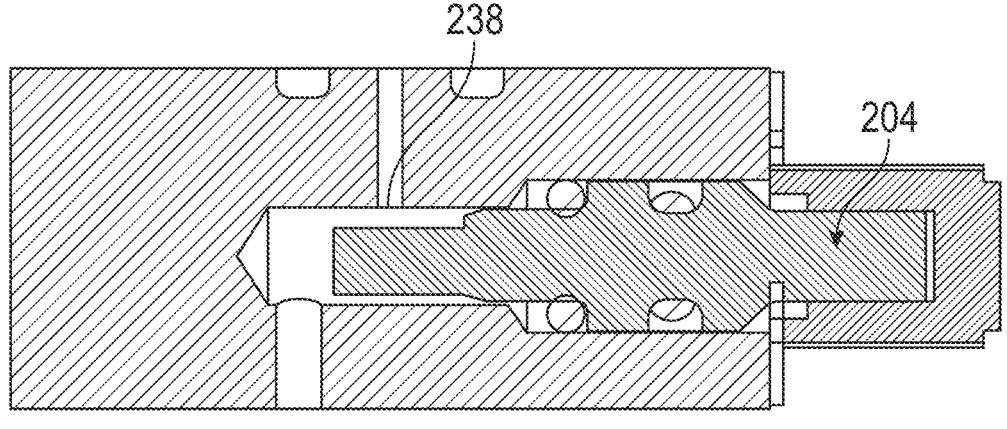
FIGS. 6A and 6B show side and end elevation cross-sections of the variable flow restrictor of FIGS. 5A and 5B in a fully-open configuration.
Figure 6B:
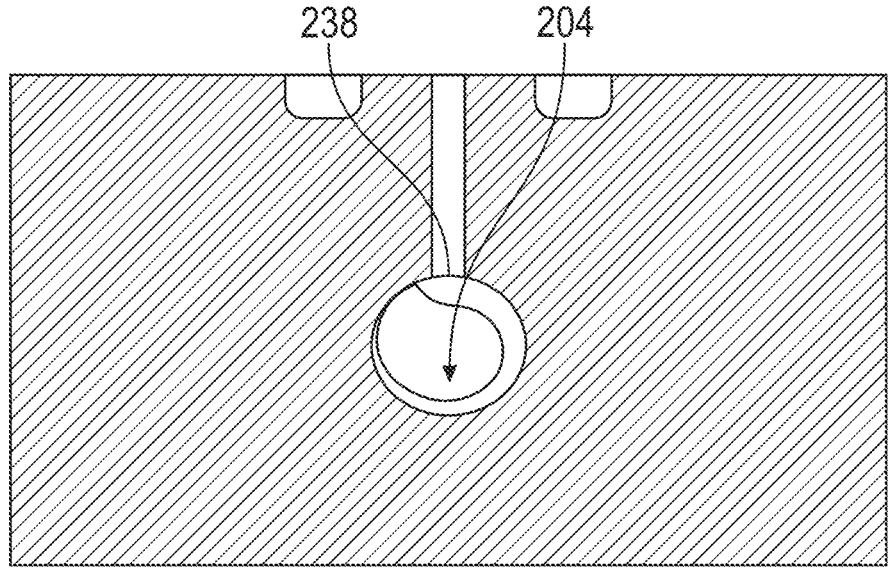

FIGS. 6A and 6B show the variable flow restrictor 204 of FIGS. 5A and 5B in a fully-open configuration. FIG. 6A shows a side elevation cross-section of the restrictor 204 and FIG. 6B shows an end elevation cross-section of the restrictor 204 taken at the depth of the first aperture 238.

In order to transition between the near-closed configuration shown in FIGS. 5A and 5B to the fully-open configuration shown in FIGS. 6A and 6B, the variable flow restrictor 204 is rotated clockwise (when viewed as shown in FIGS. 5B and 6B) by approximately 300° about the central longitudinal axis of the variable flow restrictor 204. This rotation results in a gradual increase in the distance between the first aperture 238 and the outer surface of the variable flow restrictor 204 and, thus, a gradual increase in the sensitivity of the valve member 12.

Control fluid can flow both longitudinally (as described above) and circumferentially around or along the variable flow restrictor 204. The extent to which the flow is split between longitudinal and circumferential paths will depend on the area of each flow path. For example, if the restrictor 204 is designed with a narrow or shallow cutaway 244a, a high proportion of the flow will follow a longitudinal path around the restrictor 204. Conversely, if the restrictor is designed with a wider or deeper cutaway 244a, a lower proportion of the flow will follow the longitudinal paths into the chamber or circumferentially extending groove (not shown in this Figure).

However, it will be appreciated that the restrictive effect of the variable flow restrictor 204 will be largely unaffected by which route is taken by the control fluid (whether predominantly longitudinal or circumferential). Rather, the level of restriction is determined according to the distance between the outer surface of the variable flow restrictor 204 and the first aperture 238, said distance being adjustable depending on the rotation of the restrictor 204, as described above.

The pressure drop across the variable flow restrictor 204 can be adjusted by varying this distance, i.e. by rotating the variable flow restrictor 204. The greater the distance between the outer surface of the restrictor 204 and the first aperture 238, the lower the fluid velocity and thus the pressure drop.

It can be seen from the above that, in at least preferred embodiments, the fluid flow control device and the damping system of the present invention provide a device for controlling the flow in a conduit in which the sensitivity of the fluid flow control device can be adjusted in a simple, reliable and cost effective manner. Once the flow control device is installed, the damping system may be controlled by rotating the variable flow restrictor to adjust the rate of flow of control fluid, thereby selecting the required level of sensitivity.

While a number of particular embodiments have been described above with reference to the Figures, those skilled in the art will appreciate that any number of variations and alternatives may exist within the scope of the present invention. For example, the variable flow restrictor and the restriction volume may be different sizes or shapes that cause the cross-sectional area of the control fluid flow path to vary as the variable flow restrictor is rotated. It will be appreciated that, with different designs of the variable flow restrictor, the change in control fluid flow rate as the restrictor is rotated may be tuned as desired for particular implementations.

The invention claimed is:

1. A damping system for a fluid flow control device, the damping system comprising:

a housing, defining a control fluid feed for introducing a control fluid to a control volume of the fluid flow control device, wherein the control fluid feed comprises a restriction volume defined by the housing, the restriction volume comprising an inlet and an outlet, wherein the inlet and the outlet are coaxial; and a variable flow restrictor, arranged within the restriction volume between the inlet and the outlet and arranged to rotate about an axis of rotation of the variable flow restrictor, wherein an outer surface of the variable flow restrictor and a wall of the restriction volume together define:

an axial conduit extending in a direction parallel to the axis of rotation of the variable flow restrictor; and a circumferential conduit extending around a circumference of the variable flow restrictor, wherein the axial conduit and the circumferential conduit comprise respective distinct portions of a flow path connecting the inlet and the outlet;

wherein a cross-section of the variable flow restrictor in a plane perpendicular to the axis of rotation comprises diametrically opposed first and second lobes extending from the axis of rotation of the variable flow restrictor such that a cross-sectional area of the flow path in a plane parallel to the axis of rotation varies as the variable flow restrictor is rotated;

wherein a diameter of the variable flow restrictor extends through the axis of rotation of the variable flow restrictor from a first side of the variable flow restrictor to a second side of the variable flow restrictor;

wherein the first lobe is arranged on the first side of the variable flow restrictor and the second lobe is arranged on the second side of the variable flow restrictor, such that an imaginary straight line connecting the first lobe and the second lobe passes through the axis of rotation of the variable flow restrictor; and wherein: a perimetrically extending groove is defined in the outer surface of the variable flow restrictor; wherein the perimetrically extending groove extends around the perimeter of the variable flow restrictor by at least a distance by which the inlet and outlet are perimetrically separated, wherein the perimetrically extending groove is axially offset from the inlet of the restriction volume along a length of the variable flow restrictor; wherein the perimetrically extending groove is located between:

a seal; and the first lobe and the second lobe;

wherein the perimetrically extending groove comprises the circumferential conduit and the axial conduit extends from the inlet to the circumferential conduit along the outer surface of the variable flow restrictor.

2. The damping system of claim 1, wherein the cross-section of the variable flow restrictor comprises a circle, and wherein each of the first lobe and the second lobe radially protrudes from the circle.

3. The damping system of claim 1, wherein the first lobe and the second lobe each comprise a circumferential discontinuity in the outer surface of the variable flow restrictor.

* * * * *